United States Patent [19]

Cocklereece

[11] 4,250,837
[45] Feb. 17, 1981

[54] POULTRY NEST BANK UNIT

[76] Inventor: Allan R. Cocklereece, 18 Chaumont Sq., NW., Atlanta, Ga. 30327

[21] Appl. No.: 20,421

[22] Filed: Mar. 14, 1979

[51] Int. Cl.³ ............................................. A01K 31/16
[52] U.S. Cl. ...................................................... 119/48
[58] Field of Search ....................... 119/17, 21, 22, 48, 119/49

[56] References Cited

U.S. PATENT DOCUMENTS

| | | | |
|---|---|---|---|
| 2,264,959 | 12/1941 | Sperry et al. | 119/48 |
| 2,266,685 | 12/1941 | Dadlow | 119/48 |
| 2,512,861 | 6/1950 | Hill | 119/48 |
| 2,676,566 | 4/1954 | Krieger | 119/17 |
| 3,242,904 | 3/1966 | Rannou | 119/48 |
| 3,381,664 | 5/1968 | Barlocci | 119/48 X |
| 3,916,836 | 11/1975 | Jüstl | 119/17 |

FOREIGN PATENT DOCUMENTS 146206  4/1952  Australia .................................. 119/48

Primary Examiner—Gene Mancene
Assistant Examiner—Robert P. Swiatek
Attorney, Agent, or Firm—Birch, Stewart, Kolasch & Birch

[57] ABSTRACT

A poultry nest bank for housing laying hens is described. The nest bank unit is formed from plastic material and includes molded plastic trays or shelves therein in which the hens nest. The trays slope toward the rear of the nest bank unit housing, so that eggs laid by the hens roll to the back of the housing where they can be gathered by an attendant, through an access opening in the rear of the housing. The housing includes front and back molded housing portions, having outwardly extending peripheral rims or edges. The rims are secured together by suitable fasteners to hold the body together as a rigid, integral unit. The trays of the unit are removable to facilitate easy cleaning thereof.

8 Claims, 5 Drawing Figures

POULTRY NEST BANK UNIT

BACKGROUND OF THE INVENTION

This invention relates to a nest bank unit for housing laying hens. In the commercial production of chicken eggs, for example, it is necessary that a large number of chickens be housed and attended with a minimum expenditure of labor and and money. This requires that the nesting arrangement for the hens be easily attended by an individual to permit rapid gathering of the eggs, and of particular importance, to permit the quick and effective cleaning of the unit.

One type of nesting unit that has been used in the past is comprised of a galvanized metal housing that is partitioned into twelve individual bins or nests that are arranged in two tiers, or levels, of six bins each. The housing unit is formed by seven spaced apart, vertical galvanized panels or partitions that are aligned with their broad sides parallel to each other. The partitions are maintained as a rigid and fixed unit by metal bracing strips that extend from one end to the other along the front and back edges of the partitions. Metal bottoms or floors are placed horizontally between the bottom ends and between the mid regions of adjacent partitions to form the upper and lower bins or nests. In this manner, each nest bank forms twelve nests for as many hens.

The hens nest and lay their eggs in the individual bins. To gather the eggs, an attendant must search in each bin for the eggs laid therein. This is somewhat time consuming. A further disadvantage of this type of nest bank is that the hens frequently break some of the eggs when walking around the nests. This requires that the attendant make frequent rounds to gather the eggs before the hens can break them.

Furthermore, the hens frequently have dirty feet, and otherwise dirty the nests, so that that the eggs become dirty. This requires that the eggs be washed, a further expenditure of time and labor. Moreover, dirty eggs can lead to diseased chicks. This can lead to a serious loss to the producer.

Galvanized nest banks of the type described above are difficult to effectively clean. The bottoms of the bins rust out and must be replaced every several years.

The improved plastic nest bank unit of my invention eliminates the above, and other, problems and provides an easily attended nest bank that is relatively inexpensive to acquire and to maintain, is more sanitary, and affords a greater yield of eggs.

BRIEF DESCRIPTION OF THE DRAWINGS

The invention will be described by referring to the accompanying drawings wherein.

DESCRIPTION OF PREFERRED EMBODIMENT

Figure 1:
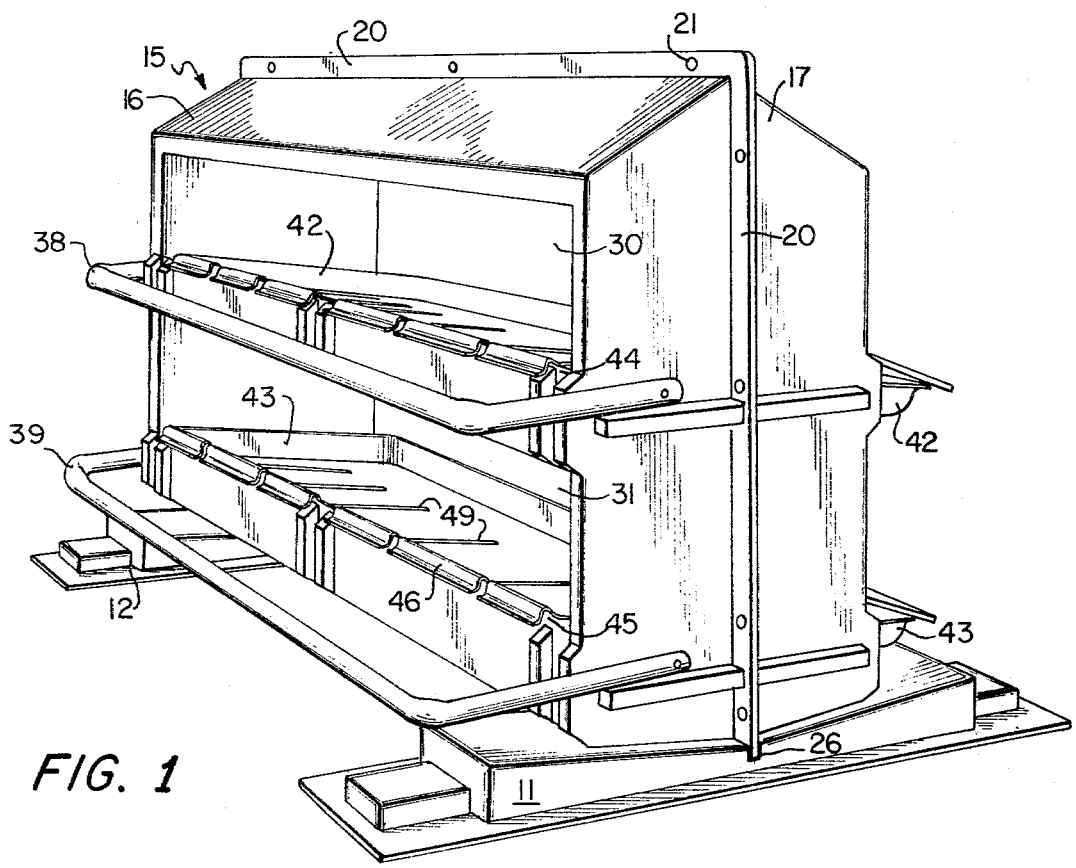
FIGS. 1 and 2 are perspective views showing, respectively, the front and back of the nest bank unit of this invention.

The nest bank unit is molded from a suitable plastic material that forms rigid, self-supporting component parts. The unit is comprised of spaced apart base members 11 and 12 that rest squarely on the floor. Extending between base members 11 and 12, and supported upright thereon, is a housing member 15 that is comprised of individually molded front and back housing portions 16 and 17. Both the front and back portions have an outwardly extending peripheral rim or edge 20. Rims 20 are secured together by suitable fastening means, such as nuts and bolts 21, to hold the body member together as a rigid integral unit.

Figure 3:
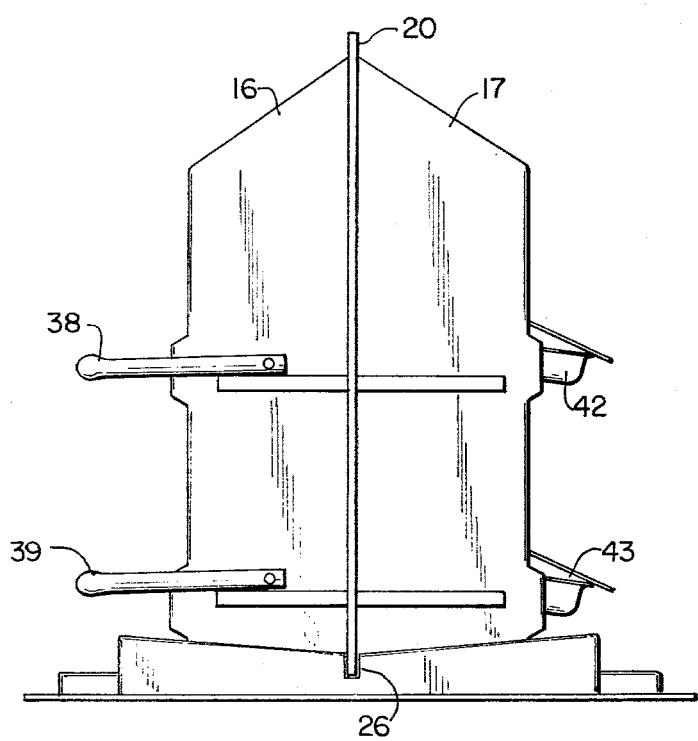
FIG. 3 is a side view of the nest bank unit of FIGS. 1 and 2.

Each of the base members 11, 12 has a transverse notch 26 at the mid region of its top surface. The outwardly extending rims 20 on the bottoms of the joined front and back housing portions 16 and 17 snugly fit within the notches 26 on the two base members. Additionally, as best seen in FIG. 3, the bottom surfaces of front and back housing portions 16 and 17 are slightly inclined toward their respective rims 20 so that they form a convex surface when joined together. The mid region of base members 11 and 12 have complementary concave surfaces to receive the convex surface on the bottom of housing member 15. Housing member 15 therefore is snugly and solidly supported on the base members.

The top surfaces of front and back housing members 16 and 17 are inclined downwardly from rims 20 to form a peaked roof.

Front housing portion 16 has upper and lower rectangular openings 30 and 31 that extend almost the entire distance across the front surface thereof. Openings 30 and 31 are at least as high as the hens that are to be placed in the unit. The back housing portion 17 also has upper and lower rectangular openings 35 and 36 that extend almost entirely across the back surface. Openings 35 and 36 are too low for hens to pass through them.

Front and back housing members 16 and 17 have thin walls and each is a five sided structure so that the interior of housing member 15 is a void space.

Rods 38 and 39 are secured to front housing portion 16 and extend across the fronts of the openings 30 and 31 to provide perches for the roosting hens.

A pair of identical shallow plastic trays or shelves 42 and 43 extend across the hollow interior of housing member 15 between the respective pairs of upper and lower openings 30, 35 and 31, 36 in front and back housing portions 16 and 17. The side wall of each tray is several inches high. Spaced ridges 49 may be molded into the bottoms of the trays to add rigidity and strength to the trays.

Figure 5:
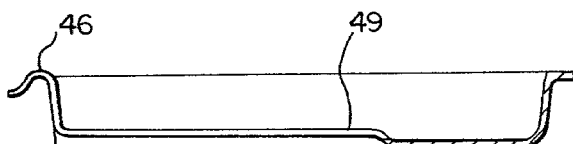

As seen in FIG. 5, the front edge of each tray has an inverted U-shaped lip or notch 46 that fits over the bottom edges 44 and 45 of openings 30 and 31 in the front housing portion 16, see FIG. 1, to secure the front edges of the trays to housing member 15.

Figure 2:
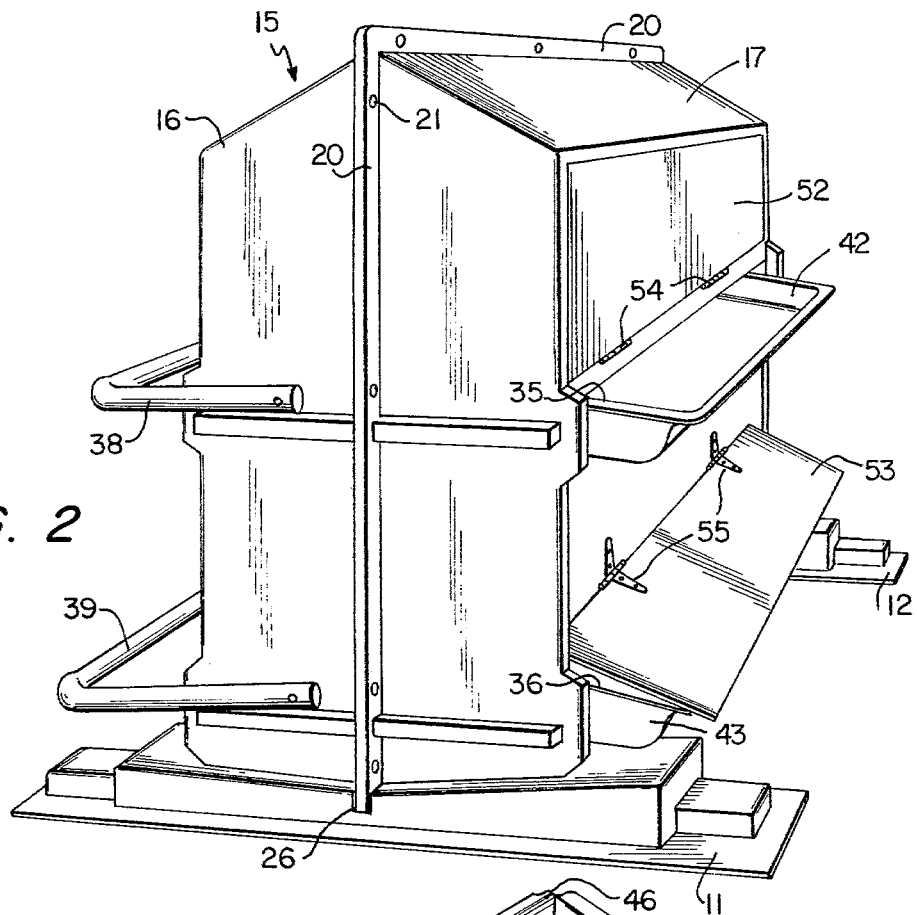
Figure 4:
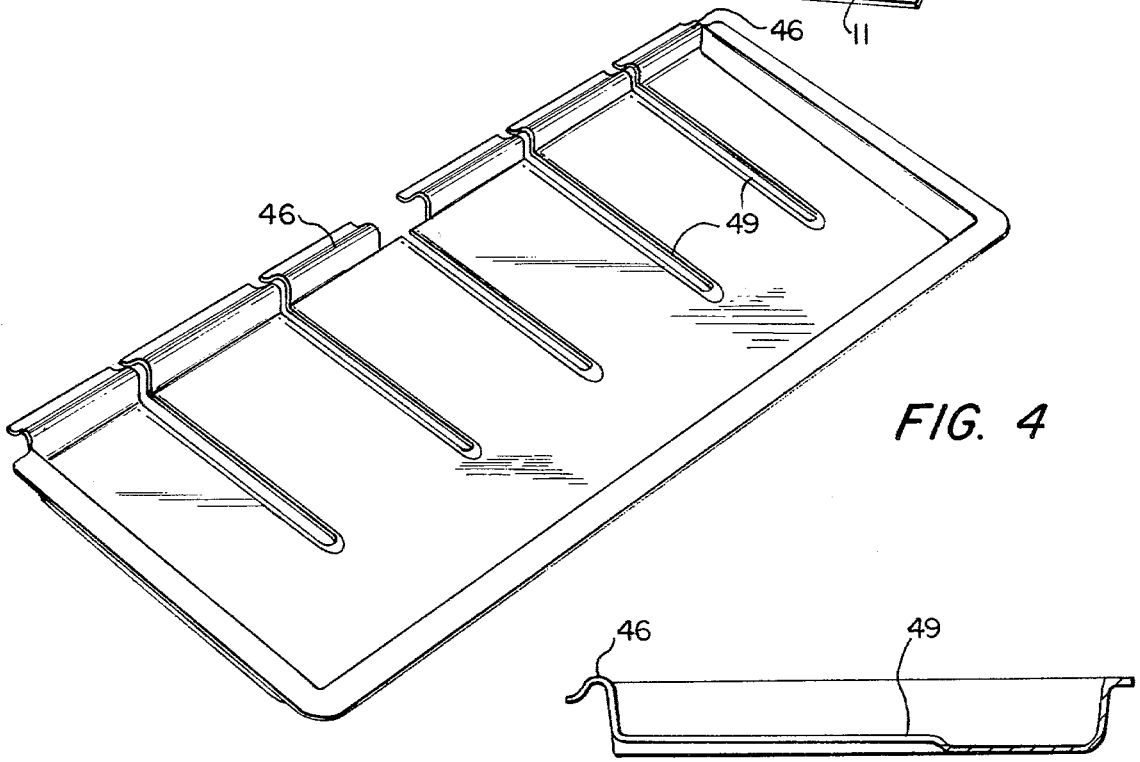
FIGS. 4 and 5 are top and side sectional views, respectively, of one of the two plastic trays or shelves that form part of the nest bank of this invention.

As seen in FIG. 2, the back edge of each tray 42 and 43 extends outwardly beyond the outside face of back housing portion 17. The bottoms of the back housing portions of the trays are supported on the bottom edges of the openings 35 and 36 in back housing portion 17. Thus, each tray may be easily inserted in the housing member 15 by sliding it through a pair of opposing openings in the front and back housing portions 16 and 17. A tray is secured into position by snapping or latching the inverted U-shaped front edge 46 over the bottom edge of a front opening. Front edge 46 of the trays may be molded or cut into a plurality of segments to import some flexibility to the U-shaped portions, thereby to facilitate the snapping or latching action.

Removal of a tray is the reverse of the procedure just described, and is just as easy.

The bottom edges of the openings 35 and 36 in back housing portion 17 are lower than the corresponding bottom edges of openings 30 and 31 in front housing portion 16. Consequently, trays 42 and 43 each slope downwardly from front to back. In practice, the backs of the trays are approximately 1.75 inches lower than the fronts.

Hens nest directly on the trays and lay their eggs on the sloping surfaces. Eggs roll by gravity to the back parts of the trays that are outside the outer surface of back housing portion 17. Openings 35 and 36 in back housing portion 17 are so low that hens cannot pass through them. Consequently, eggs collect at the rear of trays 42 and 43 and are isolated from the hens. This feature greatly minimizes breaking and soiling of the eggs by the hens.

Upper and lower pivotable lids 52 and 53 are secured by respective pairs of hinges 54 and 55 to the wall of back housing portion 17 and extend over the tops of the exposed back ends of trays 42 and 43. Lids 52 and 53 serve to keep the eggs on the back parts of the trays as clean as possible.

With all of the eggs having rolled to the backs of the trays under lids 52 and 53, it is a simple and fast operation to lift the lids and gather the eggs. Since the hens cannot now step on the eggs and break them, it is not necessary for an attendant to gather them as frequently as in the past.

Because individual bins or nests have been eliminated it is possible to house more hens on the trays.

As mentioned above, it is a simple matter to remove trays 42 and 43 to clean them and the housing member 15. Because the component parts are made of plastic they will not rust out as the galvanized units do.

When the component parts of the plastic nest bank are disassembled and stacked together, they occupy a relatively small volume that may be easily packaged in a small carton for shipping. Assembly of the component parts is a simple task that requires only a screwdriver and possibly a pair of pliers.

Although the accompanying drawings show housing member 15 supported on base members 11 and 12 that rest on the ground, it may be suspended overhead if so desired. In such case base members 11 and 12 may not be desired.

Although the presently preferred embodiment of the invention has been illustrated and described, it should be understood that alterations and changes may be made to the described embodiment without departing from the teachings of this invention.

It is claimed:

1. An improved poultry nest bank unit comprising, first and second molded plastic housing portions;
   each housing portion being comprised of a five sided relatively thin walled hollow unit having an open side and an opposite outer side;
   means for securing together the open sides of the housing portions to form a housing unit having a substantially void interior;
   a plurality of vertically arranged openings extending transversely across the outer sides of each of the first and second housing portions;
   insertable plastic trays extending between corresponding openings in the first and second housing portions and across the interior of the housing unit;
   one end of each of said trays extending outwardly beyond the outer side of the second housing portion;
   said trays being inclined toward their said one ends, whereby eggs laid on said trays roll by gravity to said one end of each tray and;
   means at said one end of each tray for stopping a rolling egg to collect laid eggs outside said housing unit.

2. The combination claimed in claim 1 including,
   one or more base members for supporting said housing unit,
   means for releasably attaching the housing unit in position on said one or more base members.

3. The combination claimed in claim 1 wherein, said openings in said first housing portion are high enough for a hen to have access to the portion of the trays on the interior of the housing unit;
   said openings in the second housing portion are not high enough for a hen to pass therethrough, thereby to isolate hens in the housing unit from eggs that roll to said one end of the trays outside the housing unit.

4. The combination claimed in claim 1 further including,
   lid means for selectively covering said one end of the trays that extend outside said housing unit.

5. The combination claimed in claim 1 and further including means for releasably securing trays to said housing unit.

6. The combination claimed in claim 5 wherein said means for releasably securing said trays comprises,
   snap or latch means along the end of said trays opposite said one end for releasably engaging the first housing portion.

7. The combination claimed in claim 6 wherein said snap or latch means comprises,
   an inverted U-shaped portion molded along said opposite end of the trays;
   said U-shaped portion being adapted to engage a bottom edge of an opening in said first housing portion.

8. The combination claimed in claim 7 wherein said U-shaped portion is an edge that is severed to form a plurality of edge portions.

* * * * *